United States Patent [19]

Johnson

[11] Patent Number: 4,755,142

[45] Date of Patent: Jul. 5, 1988

[54] TAXIDERMY FISH FORM

[76] Inventor: Brian Johnson, Rte. 1, Hwy. 14, Arena, Wis. 53503

[21] Appl. No.: 872,518

[22] Filed: Jun. 10, 1986

[51] Int. Cl.⁴ .............................................. G09B 23/00
[52] U.S. Cl. ....................................... 434/296; 428/16
[58] Field of Search ................................ 434/295–297, 434/82, 84, 86, 88; 52/100, 309.4; 428/16

[56] References Cited

U.S. PATENT DOCUMENTS

| | | | |
|---|---|---|---|
| 1,918,929 | 7/1933 | Pflueger | 434/296 |
| 2,831,271 | 4/1958 | Stitt | 434/296 |
| 3,209,686 | 10/1965 | Arthurs | 428/16 X |
| 3,548,528 | 12/1970 | Belokin, Sr. | 428/16 X |

OTHER PUBLICATIONS

Goggin et al., Apr. 1947, "Plastic Forms", a publication from the Dow Chemical Co., p. 18.
Washington Daily News, Sep. 8, 1960, one page.
Cover page, one page entitled "Fish Body Mounting Method" as well as pp. 34, 35, 36, 37 and 38 from the catalog of Authentic Taxidermy Supply Co., Jan. 1986.

*Primary Examiner*—John E. Murtagh
*Assistant Examiner*—Andrew J. Rudy
*Attorney, Agent, or Firm*—Quarles & Brady

[57] ABSTRACT

A form for use in fish taxidermy wherein a single form is supplied to the taxidermist and through the removal of indicated portions different motions of the fish can be represented. In a preferred manner the form is fabricated from an easily severed material and precut lines are provided to both indicate the removable portions as well as aid in the removal.

8 Claims, 1 Drawing Sheet

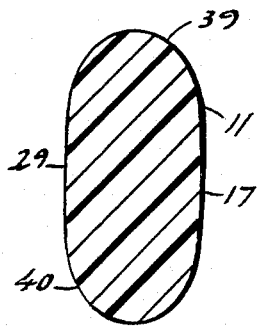
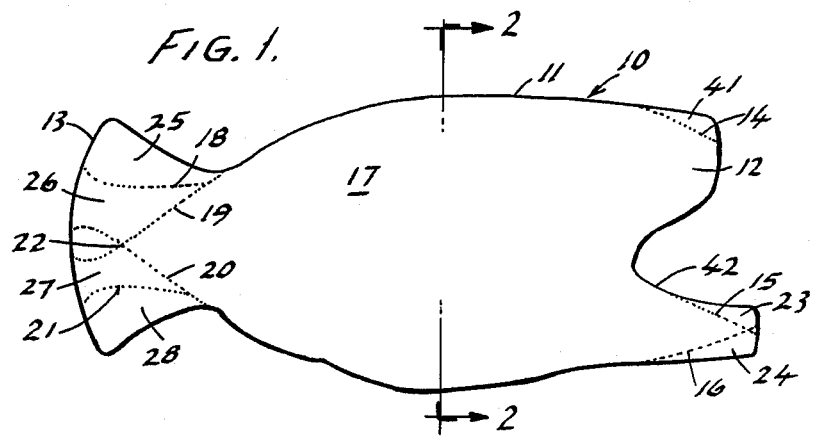
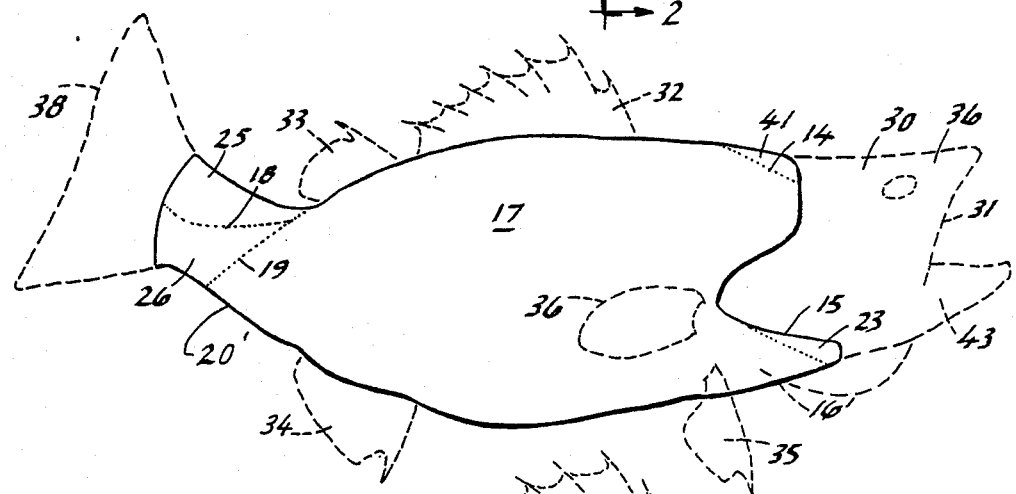
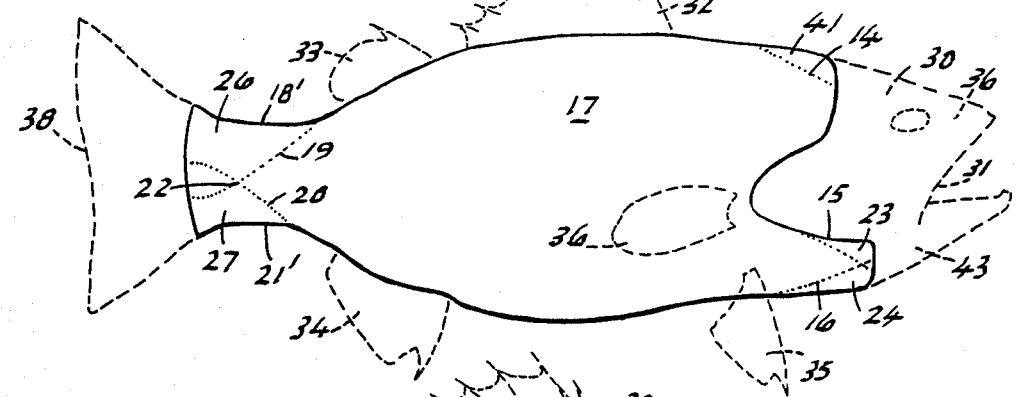
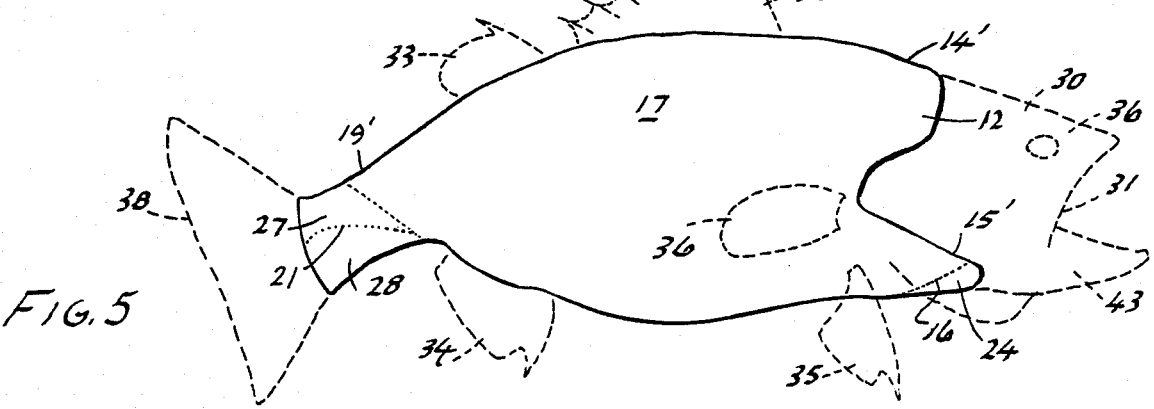

TAXIDERMY FISH FORM

BACKGROUND OF THE INVENTION

This invention relates to a form for use in taxidermy. More particularly, this invention relates to a taxidermy fish form from which the taxidermist can position fish in at least three different modes of action from a single fish form body.

In the field of fish taxidermy, it is customary to have a fish form for at least three positions in displaying the fish. One form is the straight form wherein the tail extends straight along a longitudinal axis of the fish and the lower jaw projects slightly upwardly. A second customary position is a fight up position wherein the tail, the lower jaw and head project upwardly. The third is a fight down position wherein the tail extends downwardly as well as the lower jaw and head. It is also customary to have a different fish form body for approximately every one-inch length of the fish. This means that for every one-inch increment there is required three separate fish bodies for showing the above-indicated positions.

It would be highly desirable to reduce the number of fish form bodies required for fish taxidermy in order to display the above-indicated positions. It will be appreciated that during the final taxidermy procedure, a major portion of the fish body is removed except for the skin, the tail, the gills and the jaw. These are the portions of the fish that are then mounted on the previously-described fish form.

It is an advantage of the present invention to provide a taxidermy fish form which will reduce the number of forms required for mounting or displaying a fish.

Another advantage of this invention is a taxidermy fish form of the foregoing type wherein one fish form can be utilized to mount a fish in at least three different positions.

It is yet another advantage of this invention to provide a taxidermy fish form of the foregoing type wherein portions of the fish form can be easily removed to provide various action positions.

It is still another advantage of this invention to provide a taxidermy fish form which is easily and economically manufactured.

SUMMARY OF THE INVENTION

The foregoing advantages are accomplished and the shortcomings of the prior art are overcome by the present taxidermy fish form body which will afford optional positions for a fish from a single body form. The body form is of three dimensions and depicts the general profile of a fish body with a projection at one end for supporting a fish jaw and head and a portion at the other end for supporting a tail. The body form has the usual curvature from the projection portion to said tail supporting portion. It also has a front wall, a back wall as well as top and bottom walls. Lines extend over said projection and tail supporting portion to indicate removal sections. Accordingly, when certain sections are removed from the body form, it will present a first position; when other sections are removed from the body form it will present a second position and when still other sections are removed the form will present a third position. Preferably, one of the positions will simulate a fish fighting up position; one of the positions will simulate a fish fighting down position; and one of the positions will simulate a fish in a straight position. The fish form is fabricated from a plastic material such as a polyurethane which is easily severable and the lines extending over the projection and tail supporting portions are cutaway lines. The fish fighting up position is accomplished by removing lower portions of the projection and tail supporting section; the fish fighting down position by the removal of upper portions of the projection and tail supporting sections and the straight position by removing upper and lower portions of the tail supporting section.

A novel method of using a fish taxidermy body which will offer the foregoing features is also provided.

BRIEF DESCRIPTION OF THE DRAWINGS

A better understanding of the present taxidermy body of the present invention will be accomplished by reference to the drawings wherein:

FIG. 1 is a perspective view illustrating the taxidermy form as it would be initially fabricated.

FIG. 2 is a view in vertical section taken along line 2—2 of FIG. 1.

FIG. 3 is a view in side elevation illustrating the taxidermy form after portions have been removed to illustrate one display position of a fish which is shown in phantom lines.

FIG. 4 is a view similar to FIG. 3 except showing a different altering of the fish form and a fish mounted on the form in a different position.

FIG. 5 is a view similar to FIG. 3 showing the form in still another stage and the fish in still another position.

DESCRIPTION OF THE PREFERRED EMBODIMENT

Proceeding to a detailed description of the present invention, the taxidermy form generally 10 is shown in FIG. 1 and includes a body form 11 with a head section 12 and a tail section 13. The body form 11 is slightly curved as is customary to result in a third dimensional effect and is fabricated with a third dimensional body form having the front and back walls 17 and 29 as well as upper and bottom walls 39 and 40, respectively. As shown in FIG. 1, the head section 12 has certain perforations or cut lines 14, 15 and 16. The perforation line 14 at the top of the head section 12 provides a removable section 41. The perforation lines 15 and 16 also indicate removable sections 23 and 24 for the projection 42. These removable portions will be further explained in the operation to follow. Turning to the tail section 13, it will be seen that there are further perforation lines for indicating removable portions. Perforation line 18 provides a removable portion 25. Similarly, perforation lines 19, 20 and 21 provide additional removable portions 26, 27 and 28. Numeral 22 indicates the intersection of lines 19 and 20.

A better understanding of the taxidermy body 10 will be had by a description of its operation.

Operation

As indicated in FIGS. 3, 4 and 5, a fish as represented by the fish body 30 will have the usual fins 32, 33, 34, 35, and 37 as well as the mouth 31 and jaw 43 in the head 36 and the tail 38. Assuming that a taxidermist wishes to display the fish in an upper fighting position, a cut will be made of the taxidermy body form 11 along the line 16 in the head section 12 so as to remove portion 24. Another cut will be made along the line 22 so as to remove portions 27 and 28. The resulting form will be that as shown in FIG. 3 in the fighting up position. The fish as previously described can then be placed over the form and processed in the usual manner to result in the fish as displayed in FIG. 3 with lines 16' and 22' indicating portions of the body along which cuts were made on corresponding lines. The jaw 43 and head 36 as well as the tail 38 is supported in an upward manner as indicated. Assuming that the taxidermist wishes to show the same fish in a straight manner as indicated in FIG. 4, the body 11 will be cut along the lines 18 and 21 so as to result in the removal of the portions 25 and 28. The resulting fish will be as indicated in FIG. 4 in a straight position with lines 18' and 21' indicating body portions along which cuts were made on corresponding lines. FIG. 5 represents the fish including the jaw 43 and head 36 as well as the tail 38 supported in a downward fighting position. This is accomplished by cutting the form body 11 along lines 19 of the tail section for the removal of portions 25 and 26 and cutting along the line 14 for removal of the portion 41 as well as cutting along the line 15 for removal of portion 23 in the head section 12. This results in the form of a body and fish as indicated in FIG. 5. The lines 19', 14' and 15' indicate the body portions along which cuts were made on corresponding lines.

It will thus be seen that through the present invention there is now provided a single body form which can afford the taxidermist at least three body motions for a fish without having to prepare three different body forms. The fish body in this instance is formed from a polyurethane material. However, other easily severable lightweight materials such as styrofoam or other pourable plastic foams could be utilized. The present fish form body allows taxidermists the handling of a reduced inventory of fish form bodies and accordingly reduces the cost.

While three different motion forms have been described for the taxidermy form, it is obvious that other modifications of the form can be made by removal of certain sections depending upon wishes of the taxidermist. Certain proportionate relationships have been shown which are suitable for a particular type of fish. It should be recognized that the proportions can vary depending upon the species of fish which are to be mounted. Further, the taxidermy form of this invention is suitable for use with any size fish form previously utilized.

The foregoing invention can now be practiced by those skilled in the art. Such persons will know that the invention is not necessarily restricted to the embodiments presented herein. The scope of the invention is to be defined by the terms in the following claims as giving meaning by the preceding description.

I claim:

1. A taxidermy body which will afford optional positions for a fish from a single body form comprising:
   a three-dimensional body form depicting a general profile of a fish body with a projection section at one end for supporting a fish jaw and head and a section at another end for supporting a tail;
   said body form produced from a material which is readily severable and having a front wall, a back wall as well as a top wall; and
   lines extending over said projection and tail supporting sections to indicate removal portions so that when certain portions are removed the body form will present a first position; when other portions are removed the body form will present a second position and when still other portions are removed the form will present a third position.

2. The invention according to claim 1 wherein one of said first, second or third positions simulates a fish fighting up position.

3. The invention according to claim 1 wherein one of said first, second or third positions simulates a fish fighting down position.

4. The invention according to claim 1 wherein one of said first, second or third positions simulates a fish in a straight position.

5. The invention according to claim 1 wherein said body form is fabricated from a polyurethane plastic material and said lines extending over said projection and tail supporting portions are cutaway lines.

6. The invention according to claim 2 wherein said lines indicate a removal of lower sections of said projection and tail supporting portions.

7. The invention according to claim 3 wherein said lines indicate a removal of upper sections of said projection and tail supporting portions.

8. The invention according to claim 4 wherein said lines indicate a removal of upper and lower sections of said tail supporting portion.

* * * * *